US011980960B2

(12) United States Patent
Ding et al.

(10) Patent No.: US 11,980,960 B2
(45) Date of Patent: May 14, 2024

(54) SOLDER DEVICE AND SYSTEM CONTROLLER THEREOF

(71) Applicant: Delta Electronics, Inc., Taoyuan (TW)

(72) Inventors: Ren-Feng Ding, Taoyuan (TW); Hung-Wen Chen, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 18/117,544

(22) Filed: Mar. 6, 2023

(65) Prior Publication Data
US 2023/0201944 A1  Jun. 29, 2023

Related U.S. Application Data

(62) Division of application No. 16/583,879, filed on Sep. 26, 2019, now Pat. No. 11,628,510.

(30) Foreign Application Priority Data

Aug. 22, 2019  (CN) .......................... 201910777987.0

(51) Int. Cl.
 *B23K 1/00* (2006.01)
 *B23K 1/005* (2006.01)
 (Continued)

(52) U.S. Cl.
 CPC .............. *B23K 1/0056* (2013.01); *B23K 3/08* (2013.01); *G01J 5/0003* (2013.01);
 (Continued)

(58) Field of Classification Search
 CPC ....... B23K 1/0056; B23K 3/08; G01J 5/0003; G01J 5/0806; G02B 27/141; G02B 27/30
 See application file for complete search history.

(56) References Cited

U.S. PATENT DOCUMENTS 5,026,979 A   6/1991 Ortiz, Jr. et al.
5,460,451 A   10/1995 Wadman
         (Continued)

FOREIGN PATENT DOCUMENTS

CN   103182605 A     7/2013
CN   104625405 A  *  5/2015   ........... B23K 1/0016
         (Continued)

OTHER PUBLICATIONS

Bondu et al., Multispectral photoacoustic microscopy and optical coherence tomography using a single supercontinuum source, Photoacoustics 9 (2018) 21-30 (Year: 2018).*

(Continued)

*Primary Examiner* — Peter Radkowski
(74) *Attorney, Agent, or Firm* — KIRTON McCONKIE; Evan R. Witt (57) ABSTRACT

A system controller includes a light source, an optical guiding assembly, a sensor and a feedback controller, and is applied to perform a solder operation with a solder module. The light source emits waveband light guided to a to-be-soldered area for heating. The optical guiding assembly is disposed between the light source and the solder module, and the waveband light is guided to the solder module by the optical guiding assembly. The sensor is disposed on another side of the optical guiding assembly for receiving a sensing light beam and then generating a sensing signal. The sensing light beam is guided to the sensor by the optical guiding assembly. The feedback controller is connected with the sensor and the light source for receiving the sensing signal and then controlling the light source. The system controller is a static part, and the solder module is a dynamic part.

15 Claims, 5 Drawing Sheets

(51) Int. Cl.
*B23K 3/08* (2006.01)
*G01J 5/00* (2022.01)
*G01J 5/0806* (2022.01)
*G01J 5/0808* (2022.01)
*G02B 27/14* (2006.01)
*G02B 27/30* (2006.01)

(52) U.S. Cl.
CPC ........... *G01J 5/0806* (2013.01); *G01J 5/0808* (2022.01); *G02B 27/141* (2013.01); *G02B 27/30* (2013.01)

(56) References Cited

U.S. PATENT DOCUMENTS

| | | | |
|---|---|---|---|
| 6,278,078 | B1 | 8/2001 | Walvoord et al. |
| 6,344,625 | B1 | 2/2002 | Kim et al. |
| 8,456,523 | B2 | 6/2013 | Stork genannt Wersborg |
| 9,925,715 | B2 * | 3/2018 | Cheverton .............. B22F 12/49 |
| 11,628,510 | B2 * | 4/2023 | Ding ................... G02B 27/141 |
| | | | 219/121.6 |
| 2003/0132273 | A1 * | 7/2003 | Gong ................... H05K 3/3494 |
| | | | 228/248.1 |
| 2012/0043305 | A1 | 2/2012 | Kelly et al. |
| 2015/0268099 | A1 * | 9/2015 | Craig .................... G01J 5/0003 |
| | | | 374/130 |
| 2015/0375456 | A1 * | 12/2015 | Cheverton ............. B33Y 50/02 |
| | | | 425/169 |
| 2021/0053132 | A1 * | 2/2021 | Ding .................... G01J 5/0003 |

FOREIGN PATENT DOCUMENTS

| | | |
|---|---|---|
| CN | 104625405 A | 5/2015 |
| CN | 105136858 A | 12/2015 |
| DE | 102009017900 A1 | 10/2010 |
| JP | S63203269 A | 8/1988 |
| JP | 2000042775 A | 2/2000 |
| JP | 2002001521 A | 1/2002 |
| JP | 2004337874 A | 12/2004 |
| JP | 2009148812 A | 7/2009 |
| JP | 2010214380 A | 9/2010 |
| JP | 2015131314 A | 7/2015 |
| TW | I340055 B | 4/2011 |
| TW | M437754 U | 9/2012 |
| TW | 201711781 A | 4/2017 |
| TW | 201832855 A | 9/2018 |

OTHER PUBLICATIONS

Mrna et al, Adaptive optics for control of the laser welding process, EPJ Web of Conferences 48, 00017 (2013) DOI: 10.1051/epjconf/20134800017 (Year: 2013).*

* cited by examiner

SOLDER DEVICE AND SYSTEM CONTROLLER THEREOF

CROSS-REFERENCE TO RELATED APPLICATION

This application is a divisional application of U.S. application Ser. No. 16/583,879 filed on Sep. 26, 2019 and entitled "SOLDER DEVICE AND SYSTEM CONTROLLER THEREOF", which claims priority from China Patent Application No. 201910777987.0, filed on Aug. 22, 2019. The entire contents of the above-mentioned patent applications are incorporated herein by reference for all purposes.

FIELD OF THE INVENTION

The present invention relates to a solder device, and more particularly to a solder device and a system controller thereof.

BACKGROUND OF THE INVENTION

A solder process is one of the necessary operations of producing electronic products. Accompanying with the trend of tightening products and the limitations of mechanism or actions of the conventional solder equipment, the contact soldering processes of prior art cannot satisfy the present requirements. Under this circumstance, non-contact soldering processes are developed in the industries.

In the present non-contact soldering processes, a light source is utilized to heat the to-be-soldered area, a sensing light beam is collected with the light source coaxially or non-coaxially, and then the light source is controlled according to the sensing result and/or the feedback control.

However, regardless of whether the sensing light beam is collected in a coaxial or non-coaxial manner, the conventional soldering module is composed of optical components and solder-related components, which tends to make the overall bulky and cannot make the product miniaturized. If the sensing light beam is collected coaxially, the adjustment of the optical characteristics such as the optical path and the light spot is very complicated, and it takes a considerable time and labor cost. On the other hand, if the sensing light beam is collected non-coaxially, the volume of the optical components will be even larger. In addition, no matter it is a coaxial or non-coaxial manner, the light source and the soldering module are independently installed. After a long period of operation, adjustment is required, and the accuracy is easily reduced due to tolerance or assembling problems. Moreover, since the conventional soldering module is installed on a mobile vehicle (e.g. a robot arm), the optical path system must be often adjusted accordingly due to the positional movement, which is very inconvenient.

Therefore, there is a need of providing an improved solder device and an improved system controller thereof in order to solve the above drawbacks.

SUMMARY OF THE INVENTION

Some embodiments of the present invention are to provide a solder device and a system controller thereof in order to overcome at least one of the above-mentioned drawbacks encountered by the prior arts.

The present invention provides a solder device and a system controller thereof. By integrating the optical guiding assembly, the sensor and the feedback controller as a system controller, the overall solder device can be even more compact. Since the optical path system is coaxial, the volume and weight of the solder device is reduced.

The present invention also provides a solder device and a system controller thereof. Since the main components are integrated into a static system controller and a dynamic solder module, the instability possibly caused by the dynamic part, and the load on the vehicle can be reduced, so that the accuracy of the overall solder device is enhanced.

In accordance with an aspect of the present invention, there is provided a solder device. The solder device includes a light source, a solder module, an optical guiding assembly, a sensor and a feedback controller. The light source emits waveband light. The waveband light is guided to a to-be-soldered area by the solder module for heating to perform a solder operation. The optical guiding assembly is disposed between the light source and the solder module, and the waveband light is guided to the solder module by the optical guiding assembly. The sensor is disposed on another side of the optical guiding assembly relative to the solder module for receiving a sensing light beam and generating a sensing signal according to a sensing result of the sensing light beam. The sensing light beam is guided to the sensor by the optical guiding assembly. The feedback controller is connected with the sensor and the light source for receiving the sensing signal and controlling the light source according to the sensing signal. The optical guiding assembly, the sensor and the feedback controller are integrated as a system controller.

In accordance with another aspect of the present invention, there is provided a system controller applied to perform a solder operation with a solder module. The system controller includes a light source, an optical guiding assembly, a sensor and a feedback controller. The light source emits waveband light. The optical guiding assembly is disposed between the light source and the solder module, and the waveband light is guided to the solder module by the optical guiding assembly. A to-be-soldered area is heated by the waveband light to perform the solder operation. The sensor is disposed on another side of the optical guiding assembly relative to the solder module for receiving a sensing light beam and generating a sensing signal according to a sensing result of the sensing light beam. The sensing light beam is guided to the sensor by the optical guiding assembly. The feedback controller is connected with the sensor and the light source for receiving the sensing signal and controlling the light source according to the sensing signal.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
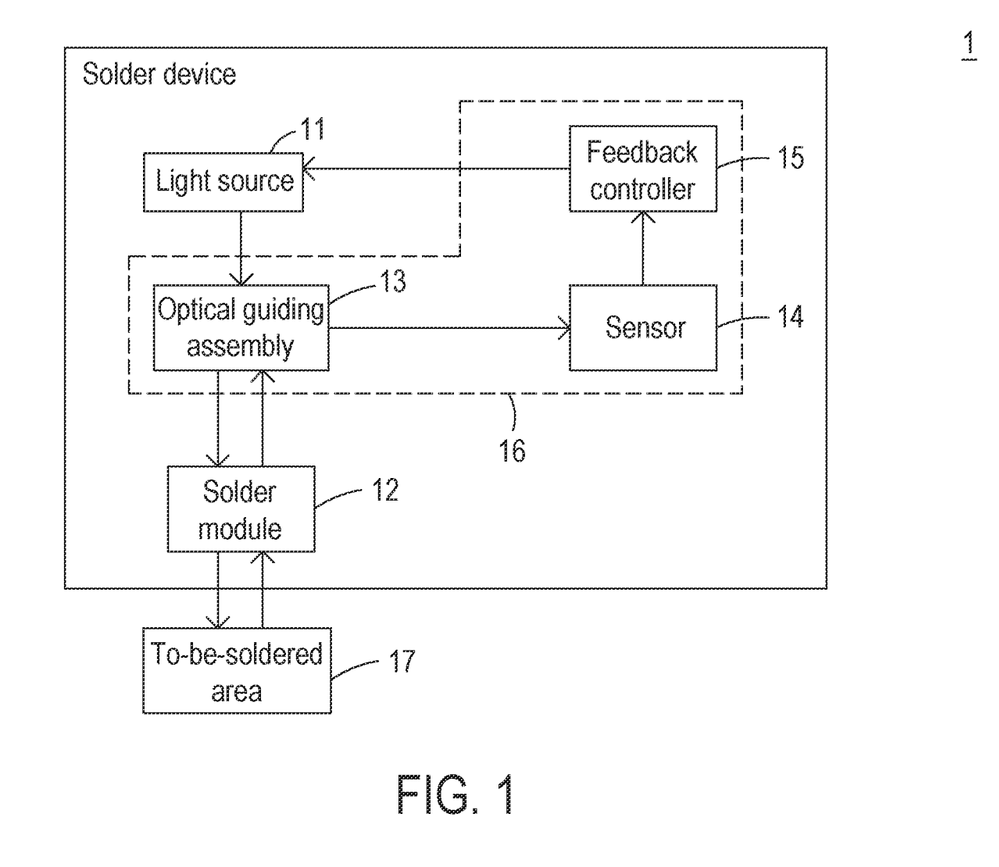
FIG. 1 schematically illustrates the configuration of a solder device according to an embodiment of the present invention.
Figure 2:
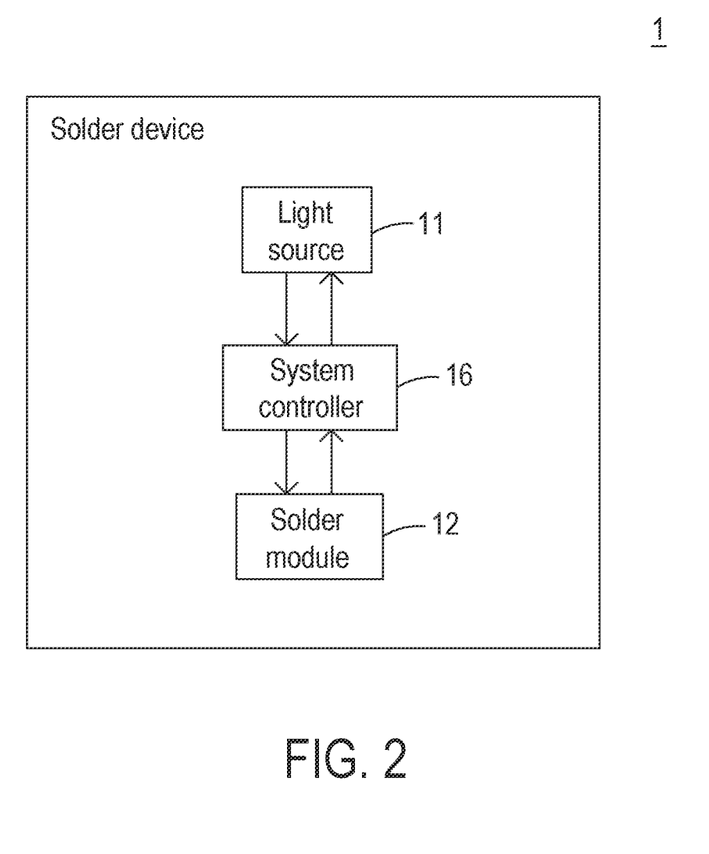
FIG. 2 schematically illustrates the configuration of the solder device shown in FIG. 1 and a system controller thereof.

Please refer to FIG. 1 and FIG. 2. FIG. 1 schematically illustrates the configuration of a solder device according to an embodiment of the present invention. FIG. 2 schematically illustrates the configuration of the solder device shown in FIG. 1 and a system controller thereof. As shown in FIG. 1 and FIG. 2, according to an embodiment of the present invention, a solder device 1 includes a light source 11, a solder module 12, an optical guiding assembly 13, a sensor 14 and a feedback controller 15. The optical guiding assembly 13, the sensor 14 and the feedback controller 15 are integrated as a system controller 16. The light source 11 emits waveband light. The waveband light described herein is light having a specific wavelength. The specific wavelength can be selected for meeting the practical requirement of a to-be-soldered area 17, e.g. laser, but not limited herein. The waveband light is guided to the to-be-soldered area 17 by the solder module 12 for heating to perform a solder operation. The optical guiding assembly 13 is disposed between the light source 11 and the solder module 12, and the waveband light is guided to the solder module 12 by the optical guiding assembly 13. The sensor 14 is disposed on another side of the optical guiding assembly 13 relative to the solder module 12. For example, a line between the optical guiding assembly 13 and the sensor 14 is perpendicular to a line between the optical guiding assembly 13 and the solder module 12, but not limited herein. The sensor 14 is utilized for receiving a sensing light beam and generating a sensing signal according to a sensing result of the sensing light beam. The sensing light beam is guided to the sensor 14 by the optical guiding assembly 13. The feedback controller 15 is connected with the sensor 14 and the light source 11 for receiving the sensing signal and controlling the light source 11 according to the sensing signal. As a result, it makes the optical path system coaxial and reduces the volume and weight.

In this embodiment, since the optical guiding assembly 13, the sensor 14 and the feedback controller 15 are integrated into the system controller 16, the solder device 1 of the present invention may be considered as having merely the light source 11, the solder module 12 and the system controller 16, but not limited herein. The light source 11 is independently set outside the system controller 16, so the light source 11 has the advantages of being easily repaired, maintained and simple replacement.

Figure 3:
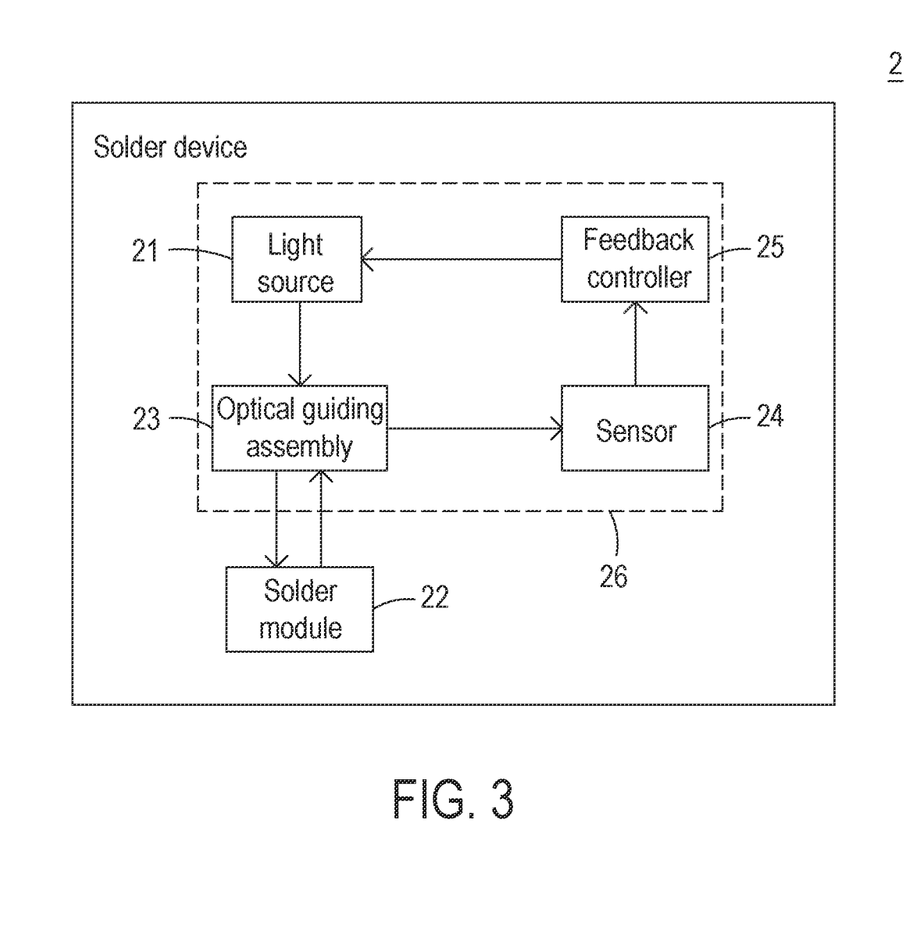
FIG. 3 schematically illustrates the configuration of a solder device according to an embodiment of the present invention.
Figure 4:
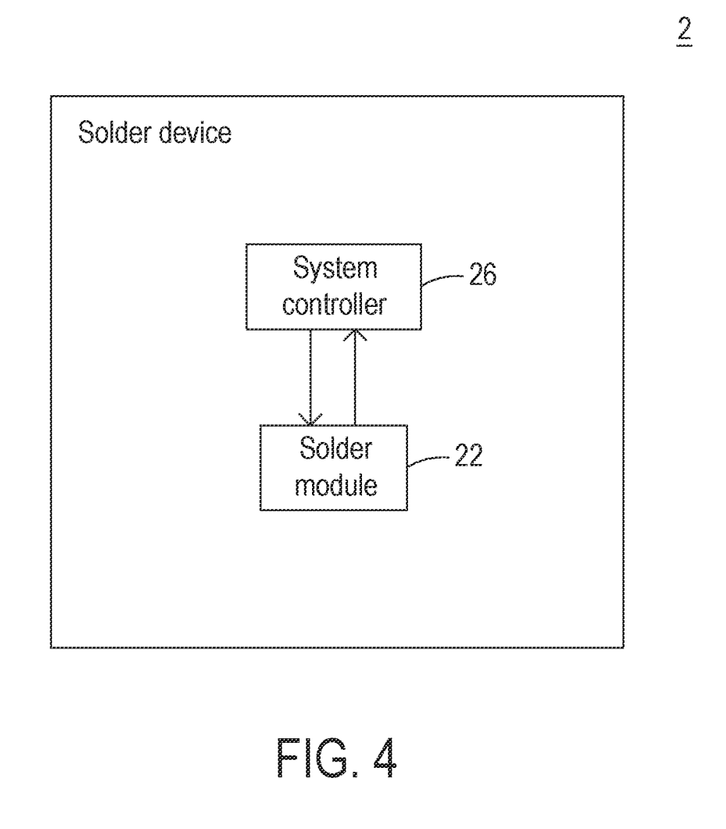
FIG. 4 schematically illustrates the configuration of the solder device shown in FIG. 3 and a system controller thereof.

In some embodiments, the light source can be also integrated in the system controller. Please refer to FIG. 3 and FIG. 4. FIG. 3 schematically illustrates the configuration of a solder device according to an embodiment of the present invention. FIG. 4 schematically illustrates the configuration of the solder device shown in FIG. 3 and a system controller thereof. As shown in FIG. 3 and FIG. 4, according to an embodiment of the present invention, a solder device 2 includes a light source 21, a solder module 22, an optical guiding assembly 23, a sensor 24 and a feedback controller 25, in which the light source 21, the solder module 22, the optical guiding assembly 23, the sensor 24 and the feedback controller 25 are similar with the light source 11, the solder module 12, the optical guiding assembly 13, the sensor 14 and the feedback controller 15, so it is not redundantly described herein. It should be noted that in this embodiment, the light source 21, the optical guiding assembly 23, the sensor 24 and the feedback controller 25 are integrated as a system controller 26. By integrating the main components (i.e. the light source 21, the optical guiding assembly 23, the sensor 24 and the feedback controller 25) into a system controller, which is a static part, and a solder module, which is a dynamic part, the instability possibly caused by the dynamic part, and the load on the vehicle can be reduced, so that the accuracy of the overall solder device is enhanced.

In some embodiments, since the light source 21, the optical guiding assembly 23, the sensor 24 and the feedback controller 25 are integrated as a single system controller 26, the solder device 2 of the present invention may be considered as having merely the solder module 22 and the system controller 26, but not limited herein. The light source 21 and the optical guiding assembly 23 can be integrated in the system controller 26, or a module or a device of another static part. In case a static part can be separated from the solder module of the dynamic part, all the related embodiment shall be considered as being included in the present invention. Because the light source 21 and the optical guiding assembly 23 are integrated into the system controller 26 of the static part, the abnormal displacement of the optical guiding assembly 23 caused by a movement or a vibration can be reduced. Since the sensor 24 is shielded and protected by the system controller 26, the electromagnetic interference can be reduced, and the signal-to-noise ratio (SNR) can be increased.

Figure 5:
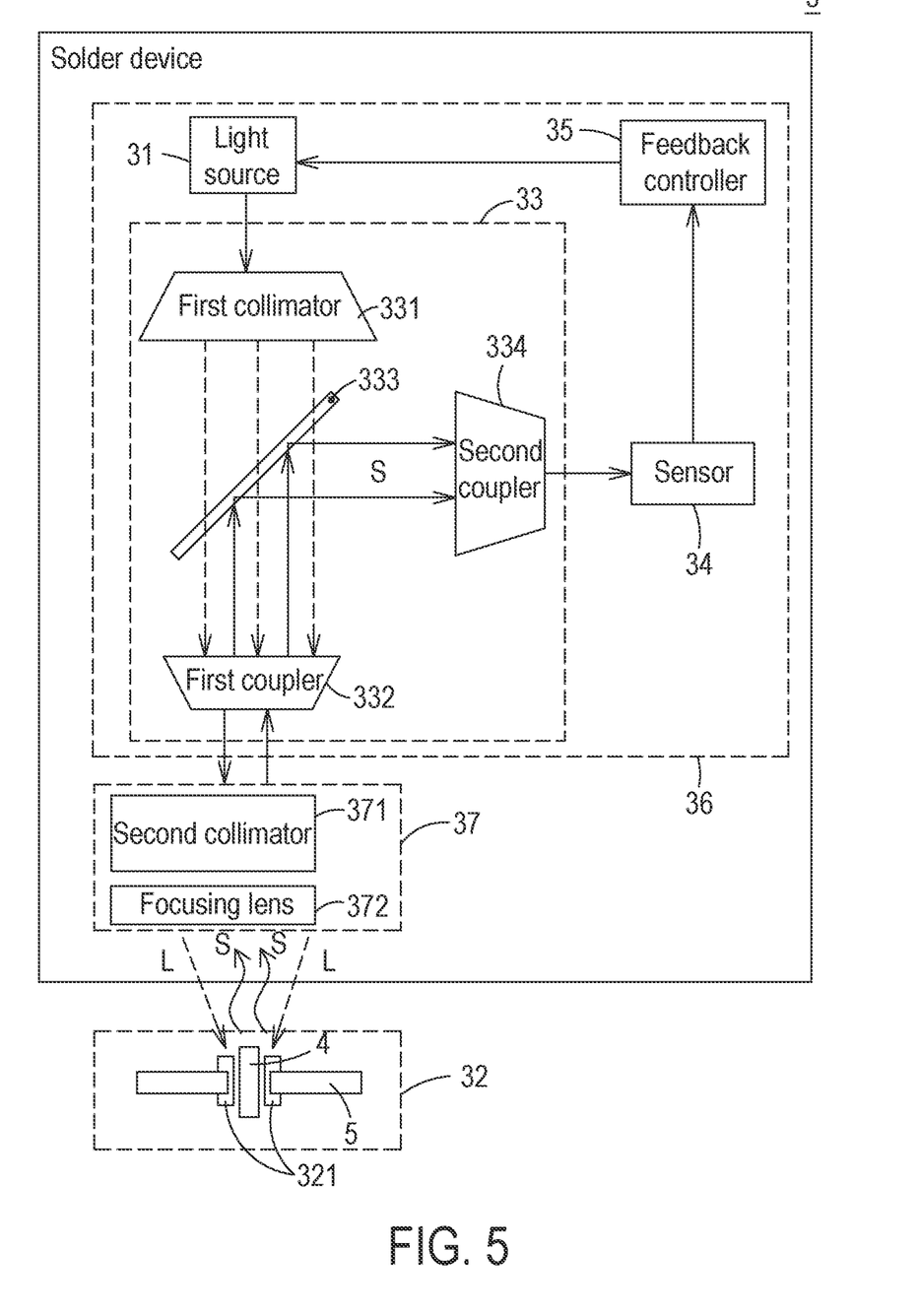
FIG. 5 schematically illustrates the detailed configuration of a solder device according to an embodiment of the present invention.

Please refer to FIG. 5. FIG. 5 schematically illustrates the detailed configuration of a solder device according to an embodiment of the present invention. As shown in FIG. 5, according to an embodiment of the present invention, a solder device 3 includes a light source 31, a solder module 37, an optical guiding assembly 33, a sensor 34 and a feedback controller 35. The basic connection relationship and functions of the light source 31, the solder module 37, the optical guiding assembly 33, the sensor 34 and the feedback controller 35 are similar with the basic connection relationship and functions of the light source 21, the solder module 22, the optical guiding assembly 23, the sensor 24 and the feedback controller 25 shown in FIG. 3 and FIG. 4, so it is not redundantly described herein. In this embodiment, the optical guiding assembly 33 includes a first collimator 331, a first coupler 332 and a dichroic component 333. The first collimator 331 is disposed adjacent to the light source 31 on an optical path of the waveband light L. The first coupler 332 is disposed adjacent to the solder module 37 on the optical path of the waveband light L. The dichroic component 333 is disposed between the first collimator 331 and the first coupler 332. In this embodiment, the waveband light L is sequentially guided by the first collimator 331, the dichroic component 333 and the first coupler 332 to the solder module 37. In specific, the waveband light L is guided as parallel light beams by the first collimator 331, the parallel light beams are transmitted through the dichroic component 333, the first coupler 332 is a collimator coupler, and the parallels light beams are converged by the first coupler 332 and guided to the solder module 37.

In some embodiments, the solder module 37 includes a second collimator 371 and a focusing lens 372, in which the second collimator 371 is for example but not limited to a laser collimator, and the focusing lens 372 is for example but not limited to a convex lens. When the waveband light L emitted by the light source 31 is laser, the second collimator 371 is preferred to be a laser collimator. On the other hand, the waveband light can be X-ray or ultraviolet, and the sensing light beam can be infrared light. In some embodiments, if the solder device is not an optical solder device, megahertz wave or microwave may also be chosen as the light source, but not limited herein. The focusing lens 372 is disposed adjacent to the second collimator 371, the second collimator 371 is disposed adjacent to the first coupler 332 and disposed between the first coupler 332 and the focusing lens 372, and the waveband light L is guided by the second collimator 371 and focused by the focusing lens 372 to heat a component pin 4 so as to perform the solder operation. Furthermore, a solder pad 321 may be included on the to-be-soldered area 32. The solder pad 321 is disposed on a partial surface of a circuit board 5, and when the solder pad 321 is heated by the waveband light L to perform the solder operation, the component pin 4 and the circuit board 5 are connected with each other.

The operation process of the solder module 37 is described as following. When the waveband light is heating, the component pin 4 and the solder pad 321 are pre-heated, thereby generating a sensing light beam S (e.g. IR) because of the heat. The sensing light beam S is guided and transmitted to the sensor 34. Next, the sensor 34 feedbacks a sensing signal to the feedback controller 35 for setting a target temperature. Then, by adjusting the output power or wavelength of the light source 31, the solder material (e.g. the solder pad 321) on the to-be-soldered area 32 may reach the melting point, thereby connecting the component pin 4 with the circuit board 5 through the solder material.

In some embodiments, the optical guiding assembly 33 further includes a second coupler 334, and the second coupler 334 is disposed between the dichroic component 333 and the sensor 34. In specific, the dichroic component 333 may be designed or manufactured to make light having a specific wavelength transmit through the dichroic component 333 itself, and make light having another specific wavelength be reflected. It can be implemented by plating multilayer dielectric layers or reflective layers having alternate high-low refraction rates with the dichroic component 333, but not limited herein. In the present invention, the dichroic component 333 makes the waveband light L transmit through, the sensing light beam S is reflected by the dichroic component 333, and the sensing light beam S is converged by the second coupler 334 and guided to the sensor 34. When the sensing light beam S is received by the sensor 34, a sensing signal is generated and transmitted to the feedback controller 35, and the light source 31 is controlled by the feedback controller 35 according to the sensing signal.

In some embodiments, the light source 31 and the optical guiding assembly 33 are connected to each other with an optical fiber. The optical guiding assembly 33 and the solder module 37 are connected to each other with an optical fiber, and the waveband light and the sensing light beam coaxially share the optical fiber. On the other hand, the optical guiding assembly 33 and the sensor 34 are preferred to be connected to each other with an optical fiber, but not limited herein. Moreover, the sensor 34 and the feedback controller 35 are connected to each other with a signal wire, and the feedback controller 35 and the light source 31 are connected to each other with a signal wire, but not limited herein.

From the above discussion, the present invention provides a solder device and a system controller thereof. By integrating the optical guiding assembly, the sensor and the feedback controller as a system controller, the overall solder device can be even more compact. Since the optical path system is coaxial, the volume and weight of the solder device is reduced. Meanwhile, since the main components are integrated into a static system controller and a dynamic solder module, the instability possibly caused by the dynamic part, and the load on the vehicle can be reduced, so that the accuracy of the overall solder device is enhanced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A system controller applied to perform a solder operation with a solder module, the system controller comprising:
   a light source emitting waveband light;
   an optical guiding assembly disposed between the light source and the solder module, and the waveband light is guided to the solder module by the optical guiding assembly, wherein a to-be-soldered area is heated by the waveband light to perform the solder operation,
   a sensor disposed on another side of the optical guiding assembly relative to the solder module for receiving a sensing light beam and generating a sensing signal according to a sensing result of the sensing light beam, wherein the sensing light beam is guided to the sensor by the optical guiding assembly; and
   a feedback controller connected with the sensor and the light source for receiving the sensing signal and controlling the light source according to the sensing signal,
   wherein the system controller is a static part, and the solder module is a dynamic part.

2. The system controller according to claim 1, wherein the optical guiding assembly comprises:
   a first collimator disposed adjacent to the light source on an optical path of the waveband light;
   a first coupler disposed adjacent to the solder module on the optical path of the waveband light; and
   a dichroic component disposed between the first collimator and the first coupler.

3. The system controller according to claim 2, wherein the waveband light is sequentially guided by the first collimator, the dichroic component and the first coupler to the solder module.

4. The system controller according to claim 3, wherein the waveband light is guided as parallel light beams by the first collimator, the parallel light beams are transmitted through the dichroic component, the first coupler is a collimator coupler, and the parallels light beams are converged by the first coupler and guided to the solder module.

5. The system controller according to claim 3, wherein the solder module comprises a second collimator and a focusing lens, the focusing lens is disposed adjacent to the second collimator, the second collimator is disposed adjacent to the first coupler and disposed between the first coupler and the focusing lens, and the waveband light is guided by the second collimator and focused by the focusing lens to heat a component pin so as to perform the solder operation.

6. The system controller according to claim 5, wherein the second collimator is a laser collimator, and the focusing lens is a convex lens.

7. The system controller according to claim 5, wherein the optical guiding assembly further comprises a second coupler, and the second coupler is disposed between the dichroic component and the sensor.

8. The system controller according to claim 7, wherein the dichroic component makes the waveband light transmit through, the sensing light beam is reflected by the dichroic component, and the sensing light beam is converged by the second coupler and guided to the sensor.

9. The system controller according to claim 5, wherein the to-be-soldered area comprises a solder pad, the solder pad is disposed on a partial surface of a circuit board, and when the solder pad is heated by the waveband light to perform the solder operation, the component pin and the circuit board are connected.

10. The system controller according to claim 1, wherein the waveband light is laser, X-ray, or ultraviolet, and the sensing light beam is infrared light.

11. The system controller according to claim 1, wherein the light source and the optical guiding assembly are connected to each other with an optical fiber.

12. The system controller according to claim 1, wherein the optical guiding assembly and the solder module are connected to each other with an optical fiber, and the waveband light and the sensing light beam coaxially share the optical fiber.

13. The system controller according to claim 1, wherein the optical guiding assembly and the sensor are connected to each other with an optical fiber.

14. The system controller according to claim 1, wherein the sensor and the feedback controller are connected to each other with a signal wire.

15. The system controller according to claim 1, wherein the feedback controller and the light source are connected to each other with a signal wire.

* * * * *